(12) United States Patent
Zhang et al.

(10) Patent No.: US 9,489,918 B2
(45) Date of Patent: Nov. 8, 2016

(54) INFORMATION PROCESSING METHODS AND ELECTRONIC DEVICES FOR ADJUSTING DISPLAY BASED ON AMBIENT LIGHT

(71) Applicants: BEIJING LENOVO SOFTWARE LTD., Beijing (CN); LENOVO (BEIJING) LIMITED, Beijing (CN)

(72) Inventors: Zhenhua Zhang, Beijing (CN); Ke Shang, Beijing (CN); Guang Yang, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 37 days.

(21) Appl. No.: 14/227,049

(22) Filed: Mar. 27, 2014

(65) Prior Publication Data

US 2014/0375669 A1    Dec. 25, 2014

(30) Foreign Application Priority Data

Jun. 19, 2013  (CN) .......................... 2013 1 0244013
Aug. 8, 2013   (CN) .......................... 2013 1 0344455

(51) Int. Cl.
G09G 5/02    (2006.01)

(52) U.S. Cl.
CPC ........ G09G 5/02 (2013.01); *G09G 2320/0666* (2013.01); *G09G 2360/144* (2013.01); *G09G 2360/16* (2013.01)

(58) Field of Classification Search
None
See application file for complete search history.

(56) References Cited

U.S. PATENT DOCUMENTS

| | | | |
|---|---|---|---|
| 2003/0011563 A1* | 1/2003 | Wada ....................... | H04N 9/73 345/156 |
| 2003/0052868 A1* | 3/2003 | Kagawa et al. .............. | 345/204 |
| 2003/0086004 A1* | 5/2003 | Usami .................. | H04N 1/6011 348/223.1 |
| 2003/0184660 A1* | 10/2003 | Skow ......................... | 348/223.1 |
| 2006/0146065 A1* | 7/2006 | Wada ....................... | H04N 9/73 345/590 |
| 2006/0159336 A1* | 7/2006 | Uezono .................. | H04N 9/735 382/167 |
| 2006/0192878 A1* | 8/2006 | Miyahara et al. ........ | 348/333.01 |
| 2007/0052735 A1* | 3/2007 | Chou ............................. | 345/690 |
| 2007/0081102 A1* | 4/2007 | Ramanath et al. ........... | 348/602 |
| 2007/0195181 A1* | 8/2007 | Onomura ........... | H04N 5/23245 348/272 |
| 2008/0079746 A1* | 4/2008 | Ou-Yang .................. | G09G 5/02 345/589 |
| 2008/0129678 A1* | 6/2008 | Choi .................... | G09G 3/3413 345/102 |

(Continued)

*Primary Examiner* — Anh-Tuan V Nguyen (57) ABSTRACT

Information processing methods and electronic devices are provided. A method for an electronic device with a display unit may comprise: determining a first environmental light parameter under an environment where the electronic device is disposed; and determining a first display parameter for output by the display unit based on the first environmental light parameter. When the display unit performs display based on the first display parameter, a difference between a first color temperature of the display unit and a second color temperature of the environment may be less than a first preset threshold.

4 Claims, 5 Drawing Sheets

(56) References Cited

U.S. PATENT DOCUMENTS

| | | | |
|---|---|---|---|
| 2008/0291139 A1* | 11/2008 | Hsieh | G09G 3/20 345/77 |
| 2008/0292184 A1* | 11/2008 | Park | G06T 5/009 382/168 |
| 2008/0303918 A1* | 12/2008 | Keithley | 348/223.1 |
| 2009/0251561 A1* | 10/2009 | Kuang | H04N 9/735 348/223.1 |
| 2010/0165139 A1* | 7/2010 | Muijs et al. | 348/222.1 |
| 2011/0032228 A1* | 2/2011 | Ho | G09G 3/20 345/207 |
| 2011/0043522 A1* | 2/2011 | Zhou et al. | 345/426 |
| 2011/0096103 A1* | 4/2011 | Kato | H04N 9/73 345/690 |
| 2011/0227939 A1* | 9/2011 | Inoue | H04N 1/00129 345/589 |
| 2012/0287293 A1* | 11/2012 | Shimbaru | G01J 3/462 348/207.2 |
| 2012/0327086 A1* | 12/2012 | Shimbaru | G06T 15/80 345/427 |
| 2013/0002698 A1* | 1/2013 | Geiger | G06T 15/00 345/589 |
| 2013/0088438 A1* | 4/2013 | Shih et al. | 345/173 |
| 2013/0278643 A1* | 10/2013 | Otsuka | G09G 5/02 345/690 |
| 2013/0321618 A1* | 12/2013 | Krishnaswamy | G06T 15/80 348/135 |
| 2013/0335388 A1* | 12/2013 | Yun | G09G 5/02 345/207 |
| 2014/0104207 A1* | 4/2014 | Park et al. | 345/173 |
| 2014/0104253 A1* | 4/2014 | Koyanagi | G09G 5/02 345/207 |
| 2014/0285477 A1* | 9/2014 | Cho | G09G 3/2003 345/207 |

\* cited by examiner

FIG. 6

INFORMATION PROCESSING METHODS AND ELECTRONIC DEVICES FOR ADJUSTING DISPLAY BASED ON AMBIENT LIGHT

CROSS REFERENCE TO RELATED APPLICATIONS

This application claims priority to Chinese National Application No. 201310244013.9 filed on Jun. 19, 2013 and Chinese National Application No. 201310344455.0 filed on Aug. 8, 2013. The entire contents of each and every foregoing application are incorporated herein by reference.

TECHNICAL FIELD

The present disclosure generally relates to the electronics field, and particularly, to information processing methods and electronic devices.

BACKGROUND

As the computer technology develops, more and more electronic devices, such as, tablet computers, smart mobile phones, electronic readers, smart TVs, and the like, come into our daily life and cause us great conveniences.

Most of the electronic devices have displays. The color temperature of the displays impacts perceiving of light emitting bodies or white reflective bodies by human eyes. Generally, the color temperature of the displayer is set to be, for example, 5000K, 6500K, or 9300K, where K indicates a Kelvin temperature unit. Users can adjust the color temperature of the displays manually by screen menus on the displays to, for example, 9000K, 8000K, or the like.

SUMMARY

The inventors found there may be some disadvantages.

When a user manually adjusts a color temperature of a display of an electronic device, it is almost impossible for the user to exactly know how to adjust the color temperature to achieve a better display effect. For this reason, it may be necessary for the user to adjust the color temperature for a number of times. In an even worse case, the user may find that the adjusted color temperature cannot achieve a desired effect after a lot of tries. Therefore, there is a need for adjusting the color temperature more accurately.

Further, if a parameter value, for example, the color temperature as described above, of the display is adjusted only based on a parameter value, for example, also the color temperature, of environmental light, to be substantially identical to the color temperature of the environment light, new issues may arise. Assume that a blue image is to be displayed while the electronic device is disposed in an environment of warm light. For example, the environmental light may have a color temperature of 2000K. Then, light emitted from the display may have a color temperature which has been adjusted to be 2000K based on the color temperature of the environmental light. Thus, the image displayed by the display is rendered in a color close to red or in red, and thus is significantly different from the blue image to be displayed. As a result, the user perceives artifacts. Therefore, there is a need for alleviating the artifacts caused by determining the display parameter only based on the environmental light to improve user experiences.

The present disclosure aims to provide, among others, information processing methods and electronic devices, to meet at least some of the above needs.

According to an aspect of the present disclosure, there is provided a method for an electronic device with a display unit. The method may comprise: determining a first environmental light parameter under an environment where the electronic device is disposed; and determining a first display parameter for output by the display unit based on the first environmental light parameter. When the display unit performs display based on the first display parameter, a difference between a first color temperature of the display unit and a second color temperature of the environment may be less than a first preset threshold.

Determining the first display parameter based on the first environmental light parameter may comprise: determining a first reflection parameter of an object to be simulated; and determining the first display parameter based on the first environmental light parameter and the first reflection parameter. The first display parameter may be one based on which the display unit displays the object to be simulated.

The first environmental light parameter may comprise an environmental tristimulus value in the environment.

Determining the first display parameter based on the first environmental light parameter and the first reflection parameter may comprise: determining a first tristimulus value of the object to be simulated based on the first reflection parameter and the environmental tristimulus value; and determining the first display parameter based on the first tristimulus value.

Before determining the first display parameter based on the first tristimulus value, the method may further comprise: determining a second reflection parameter based on reflection of environmental light in the environment by the display unit; and determining a second tristimulus value for the reflection of the environmental light by the display unit based on the second reflection parameter and the environmental tristimulus value.

Determining the first display parameter based on the first tristimulus value may comprise determining the first display parameter based on the first tristimulus value and the second tristimulus value.

Determining the first display parameter based on the first tristimulus value and the second tristimulus value may comprise: determining a first RGB stimulus value corresponding to the first tristimulus value; determining a second RGB stimulus value corresponding to the second tristimulus value; determining a first difference between the first RGB stimulus value and the second RGB stimulus value; and determining the first display parameter based on the first difference.

Determining the first RGB stimulus value corresponding to the first tristimulus value may comprise mapping the first tristimulus value to the first RGB stimulus value based on a first mapping matrix. Determining the second RGB stimulus value corresponding to the second tristimulus value may comprise mapping the second tristimulus value to the second RGB stimulus value based on the first mapping matrix.

Before determining the first RGB stimulus value corresponding to the first tristimulus value and/or determining the second RGB stimulus value corresponding to the second tristimulus value, the method may further comprise calibrating the first mapping matrix.

Determining the first display parameter based on the first difference may comprise converting the first difference into a RGB gray level according to a first preset rule. The first display parameter may comprise the RGB gray level.

The first preset rule may comprise:

$$R = ((r - L_{leakage})/(L_{red\ max} - L_{leakage})) \wedge (1/\text{red gamma}) * 255,$$

$$G = ((g - L_{leakage})/(L_{green\ max} - L_{leakage})) \wedge (1/\text{green gamma}) * 255, \text{ and}$$

$$B = ((b - L_{leakage})/(L_{blue\ max} - L_{leakage})) \wedge (1/\text{blue gamma}) * 255,$$

where R indicates a red component of the RGB gray level, G indicates a green component of the RGB gray level, B indicates a blue component of the RGB gray level, $L_{leakage}$ indicates light leakage of the display unit, $L_{redmax}$ indicates a maximal display light intensity for a red component, $L_{greenmax}$ indicates a maximal display light intensity for a green component, $L_{bluemax}$ indicates a maximal display light intensity for a blue component, "red gamma" indicates a red gamma value determined based on a red component of the first difference, "green gamma" indicates a green gamma value determined based on a green component of the first difference, and "blue gamma" indicates a blue gamma value determined based on a blue component of the first difference.

According to a further aspect of the present disclosure, there is provided an electronic device. The electronic device may comprise: a display unit; a sensor configured to sense a first environmental light parameter under an environment where the electronic device is disposed; and a processor configured to determine a first display parameter for output by the display unit based on the first environmental light parameter. When the display unit performs display based on the first display parameter, a difference between a first color temperature of the display unit and a second color temperature of the environment may be less than a first preset threshold.

The processor may be further configured to determine a first reflection parameter of an object to be simulated, and to determine the first display parameter based on the first environmental light parameter and the first reflection parameter. The first display parameter may be one based on which the display unit displays the object to be simulated.

The first environmental light parameter may comprise an environmental tristimulus value in the environment.

The processor may be further configured to determine a first tristimulus value of the object to be simulated based on the first reflection parameter and the environmental tristimulus value, and to determine the first display parameter based on the first tristimulus value.

The processor may be further configured to determine a second reflection parameter based on reflection of environmental light in the environment by the display unit and to determine a second tristimulus value for the reflection of the environmental light by the display unit based on the second reflection parameter and the environmental tristimulus value, before determining the first display parameter based on the first tristimulus value.

The processor may be further configured to determine the first display parameter based on the first tristimulus value and the second tristimulus value.

The processor may be further configured to determine a first RGB stimulus value corresponding to the first tristimulus value, to determine a second RGB stimulus value corresponding to the second tristimulus value, to determine a first difference between the first RGB stimulus value and the second RGB stimulus value, and to determine the first display parameter based on the first difference.

The processor may be further configured to map the first tristimulus value to the first RGB stimulus value based on a first mapping matrix, and/or to map the second tristimulus value to the second RGB stimulus value based on the first mapping matrix.

The processor may be further configured to calibrate the first mapping matrix before determining the first RGB stimulus value corresponding to the first tristimulus value and/or determining the second RGB stimulus value corresponding to the second tristimulus value.

The processor may be further configured to convert the first difference into a RGB gray level according to a first preset rule. The first display parameter may comprise the RGB gray level.

The first preset rule may comprise:

$$R = ((r - L_{leakage})/(L_{red\ max} - L_{leakage})) \wedge (1/\text{red gamma}) * 255,$$

$$G = ((g - L_{leakage})/(L_{green\ max} - L_{leakage})) \wedge (1/\text{green gamma}) * 255, \text{ and}$$

$$B = ((b - L_{leakage})/(L_{blue\ max} - L_{leakage})) \wedge (1/\text{blue gamma}) * 255,$$

where R indicates a red component of the RGB gray level, G indicates a green component of the RGB gray level, B indicates a blue component of the RGB gray level, $L_{leakage}$ indicates light leakage of the display unit, $L_{redmax}$ indicates a maximal display light intensity for a red component, $L_{greenmax}$ indicates a maximal display light intensity for a green component, $L_{bluemax}$ indicates a maximal display light intensity for a blue component, "red gamma" indicates a red gamma value determined based on a red component of the first difference, "green gamma" indicates a green gamma value determined based on a green component of the first difference, and "blue gamma" indicates a blue gamma value determined based on a blue component of the first difference.

According to a still further aspect of the present disclosure, there is provided a method for an electronic device with a display unit. The method may comprise: obtaining an image to be displayed; determining an environmental light parameter value under an environment where the electronic device is disposed; determining a first image parameter value corresponding to the image to be displayed based on correspondence between display images and image parameter values; and adjusting a display parameter value of the display unit based on the environmental light parameter value and the first image parameter value.

Determining the environmental light parameter value under the environment where the electronic device is disposed may comprise: sensing a RGB parameter value in the environment where the electronic device is disposed by a RGB sensor provided internal to or outside the electronic device; and determining the environmental light parameter value based on the RGB parameter value.

Adjusting the display parameter value of the display unit based on the environmental light parameter value and the first image parameter value may comprise: determining a first adjustment parameter value by adding the environmental light parameter value to the first image parameter value; and adjusting the display parameter value of the display unit to the first adjustment parameter value so that the display unit is able to display the image to be displayed based on the first adjustment parameter value.

After obtaining the image to be displayed, the method may further comprise: determining a first piece of tactile feedback information corresponding to the image to be displayed based on correspondence between display images and pieces of tactile feedback information; and controlling a tactile feedback unit connected to the display unit to operate based on the first tactile feedback information, so as to provide tactile feedback corresponding to the first tactile feedback information to a user of the electronic device.

The environmental light parameter value may comprise a color temperature value in the environment, the image parameter value may comprise a color temperature value of the image, and the display parameter value may comprise a color temperature value of light emitted from the display unit.

According to a still further aspect of the present disclosure, there is provided an electronic device. The electronic device may comprise: a display unit configured to display an image to be displayed; and a controller connected to the display unit and configured to obtain the image to be displayed, determine an environmental light parameter value under an environment where the electronic device is disposed, determine a first image parameter value corresponding to the image to be displayed based on correspondence between display images and image parameter values, and adjust a display parameter value of the display unit based on the environmental light parameter value and the first image parameter value.

The electronic device may further comprise a RGB sensor provided internal to or outside the electronic device and configured to sense a RGB parameter value in the environment where the electronic device is disposed. The controller may be further configured to determine the environmental light parameter value based on the RGB parameter value.

The controller may be further configured to determine a first adjustment parameter value by adding the environmental light parameter value to the first image parameter value, and to adjust the display parameter value of the display unit to the first adjustment parameter value so that the display unit is able to display the image to be displayed based on the first adjustment parameter value.

The controller may be further configured to determine a first piece of tactile feedback information corresponding to the image to be displayed based on correspondence between display images and pieces of tactile feedback information. The electronic device may further comprise a tactile feedback unit connected to the display unit and configured to operate under control of the controller based on the first tactile feedback information, so as to provide tactile feedback corresponding to the first tactile feedback information to a user of the electronic device.

The environmental light parameter value may comprise a color temperature value in the environment, the image parameter value may comprise a color temperature value of the image, and the display parameter value may comprise a color temperature value of light emitted from the display unit.

DETAILED DESCRIPTION

According embodiments of the present disclosure, a first environmental light parameter under an environment where an electronic device is disposed may be determined, and then a first display parameter for output by a display unit of the electronic device may be determined based on the first environmental light parameter. When the display unit performs display based on the first display parameter, a difference between a first color temperature of the display unit and a second color temperature of the environment may be less than a first preset threshold. As a result, it is possible to adjust the color temperature of the display unit directly based on the first environmental light parameter to achieve a desired display effect.

Objects, features and advantages of the technology disclosed herein will become more apparent from the following descriptions of embodiments of the present disclosure, taken in conjunction with the attached drawings. However, it is to be understood that these embodiments are provided just for illustration, but are not intended to limit the present disclosure. Other alternatives and variations are apparent for those skilled in the art.

According to an embodiment of the present disclosure, there is provided a method for an electronic device with a display unit. The electronic device may comprise a notebook computer, a tablet computer, a LCD (Liquid Crystal Display) TV, and the like.

Figure 1:
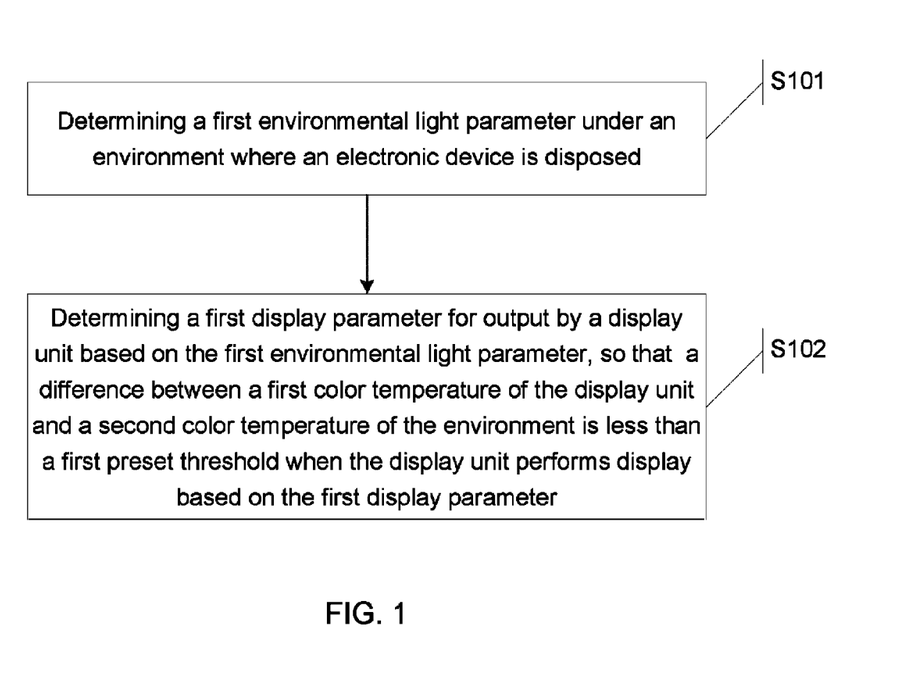
FIG. 1 is a flowchart schematically showing an information processing method according to an embodiment of the present disclosure.

Referring to FIG. 1, the method may comprise operation S101 of determining a first environmental light parameter under an environment where the electronic device is disposed, and operation S102 of determining a first display parameter for output by the display unit based on the first environmental light parameter. When the display unit performs display based on the first display parameter, a difference between a first color temperature of the display unit and a second color temperature of the environment may be less than a first preset threshold.

The first environmental light parameter may comprise an environmental tristimulus value $X_0Y_0Z_0$ in the environment, an intensity of environmental light in the environment, a color temperature of the environmental light in the environment, and the like. The first environmental light parameter may be sensed by various sensors, such as an illumination sensor, a color temperature sensor, and the like.

The operation S102 of determining the first display parameter for output by the display unit based on the first environmental light parameter may be implemented in various manners, two of which will be described in detail hereinafter. However, the present disclosure is not limited thereto.

For example, a color temperature of the environmental light may be determined directly based on the first environmental light parameter, and then the first display parameter may be adjusted to the color temperature.

For example, the first environmental light parameter may comprise the second color temperature sensed by the color temperature sensor, which can be 6000K, for example. The second color temperature may comprise any reasonable values, such as, 5000K and 10000K, and the present disclosure is not limited thereto. In this case, the first display parameter may be determined to be the first color temperature identical to or close to the second color temperature. Then, the display unit can output the first color temperature. As a result, it is possible to ensure that the environmental color temperature and the output color temperature of the display unit are substantially the same, and thus to achieve a better output effect.

Figure 2:
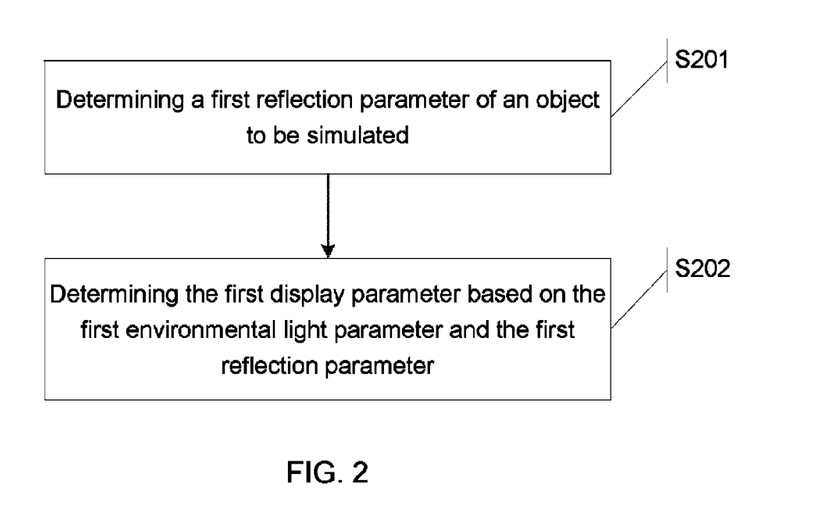
FIG. 2 is a flowchart schematically showing a process of determining a first display parameter based on a first environmental light parameter according to an embodiment of the present disclosure.

Further, referring to FIG. 2, the operation of determining the first display parameter based on the first environmental light parameter may comprise operation S201 of determining a first reflection parameter of an object to be simulated, and operation S202 of determining the first display parameter based on the first environmental light parameter and the first reflection parameter. The first display parameter may be one based on which the display unit displays the object to be simulated.

The object to be simulated may comprise paper, rock, and the like. In the case where the color temperature is adjusted as described above, only the color temperature of the display unit is adjusted. In the example shown in FIG. 2, not only the color temperature may be adjusted, but also a display effect of the display unit may mimic the object to be simulated. As a result, it is possible to control the output from the display unit in a more precise manner and thus to improve user experiences.

The first environmental light parameter may comprise the environmental tristimulus value $X_0 Y_0 Z_0$ in the environment. The operation of determining the first display parameter based on the first environmental light parameter and the first reflection parameter may comprise: determining a first tristimulus value of the object to be simulated based on the first reflection parameter and the environmental tristimulus value; and determining the first display parameter based on the first tristimulus value.

For example, the first reflection parameter f(X), f(Y), f(Z) (there may be different reflection parameters corresponding to different color spaces) may be stored in the electronic device in advance. Alternatively, the object to be simulated may be displayed on the display unit, and a reflection parameter thereof may be sensed by a sensor or some sensors as the first reflection parameter f(X), f(Y), f(Z). The first reflection parameter f(X), f(Y), f(Z) may comprise f(X)=50%, f(Y)=55%, f(Z)=60%, for example. However, the present disclosure is not limited thereto.

The first tristimulus value X, Y, Z may be calculated based on the first reflection parameter f(X), f(Y), f(Z) according to Equation [1]:

$$X = f(X) * X_0/p_i;$$

$$Y = f(Y) * Y_0/p_i;$$

$$Z = f(Z) * Z_0/p_i. \quad [1]$$

In the above equation, $p_i$ indicates the circumference ratio, which has a numerical value of about 3.1416. $p_i$ occurs in the denominator of the above equation for the following reasons. In the context of the present disclosure, the first tristimulus value represents illumination in a unit of lux, while subsequent calculations are based on brightness in a unit of nits. The denominator, $p_i$, is used to bridge these two different metrics. If they are presented in the same metric, then there is no need for the denominator of $p_i$.

Before determining the first display parameter based on the first tristimulus value, the method may further comprise: determining a second reflection parameter based on reflection of the environmental light in the environment by the display unit; and determining a second tristimulus value for the reflection of the environmental light by the display unit based on the second reflection parameter and the environmental tristimulus value.

The second reflection parameter $f_1(X)$, $f_1(Y)$, $f_1(Z)$ may be sensed by various sensors, such as, a RGB sensor, a spectrograph, a spectrometer, and the like. For example, the second reflection parameter $f_1(X)$, $f_1(Y)$, $f_1(Z)$ may comprise $f_1(X)=f_1(Y)=f_1(Z)=4\%$. However, the present disclosure is not limited thereto.

The second tristimulus value $X_1, Y_1, Z_1$ may be calculated based on the second reflection parameter $f_1(X)$, $f_1(Y)$, $f_1(Z)$ according to Equation [2]:

$$X_1 = f_1(X) * X_0/p_i;$$

$$Y_1 = f_1(Y) * Y_0/p_i;$$

$$Z_1 = f_1(Z) * Z_0/p_i. \quad [2]$$

Here, $p_i$ plays the same role as in Equation [1].

The calculation of the first tristimulus value and the calculation of the second tristimulus value may be carried out in any suitable order. For example, the calculation of the first tristimulus value may precede or follow the calculation of the second tristimulus value, or they can be carried out simultaneously.

Figure 3:
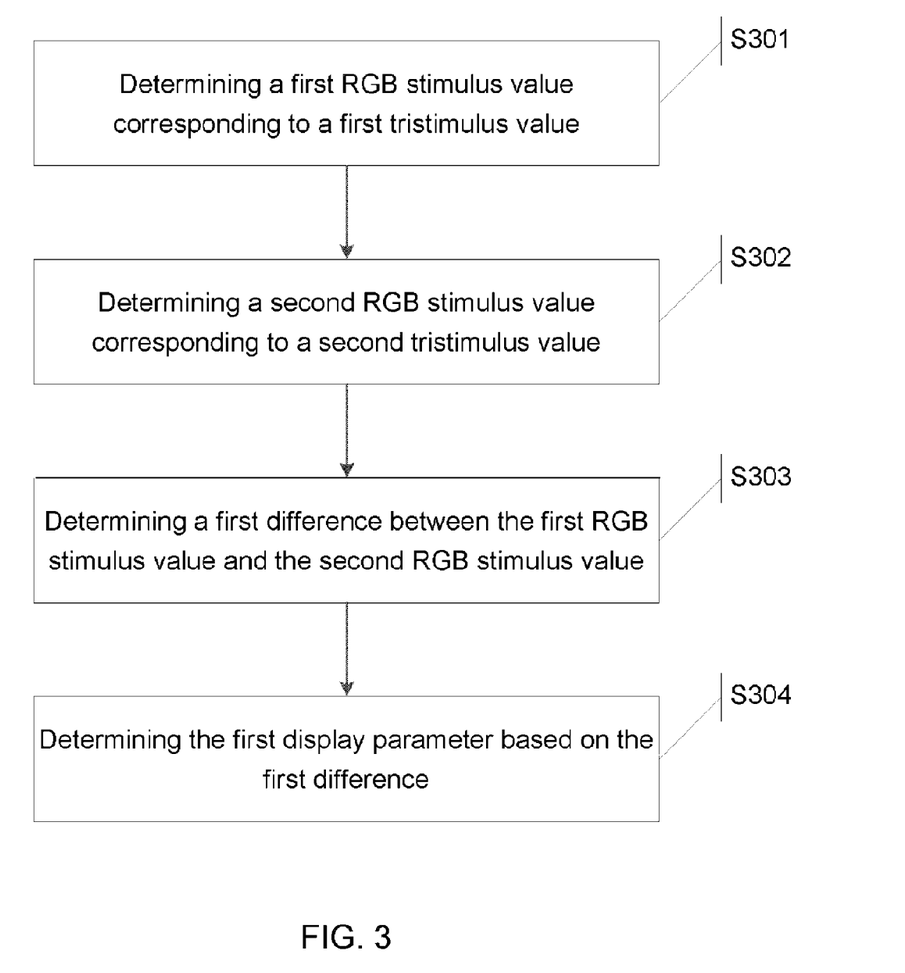
FIG. 3 is a flowchart schematically showing a process of determining a first display parameter based on a first tristimulus value and a second tristimulus value according to an embodiment of the present disclosure.

After the first tristimulus value and the second tristimulus value are calculated as above, the first display parameter may be determined based thereon. Referring to FIG. 3, the operation of determining the first display parameter may comprises operation S301 of determining a first RGB stimulus value corresponding to the first tristimulus value, operation S302 of determining a second RGB stimulus value corresponding to the second tristimulus value, operation S303 of determining a first difference between the first RGB stimulus value and the second RGB stimulus value, and operation S304 of determining the first display parameter based on the first difference.

The operation S301 and the operation S302 may be carried out in any suitable order. For example, the operation S301 may precede or follow the operation S302, or they can be carried out simultaneously.

The operation of determining the first RGB stimulus value corresponding to the first tristimulus value may comprises mapping the first tristimulus value to the first RGB stimulus value based on a first mapping matrix.

Let the first mapping matrix be:

$$T = \begin{pmatrix} T_{11} & T_{12} & T_{13} \\ T_{21} & T_{22} & T_{23} \\ T_{31} & T_{32} & T_{33} \end{pmatrix}. \quad [3]$$

The first RGB stimulus value may be determined based on the mapping matrix T according to Equation [4]:

$$r_1 = T_{11}*X + T_{12}*Y + T_{13}*Z;$$

$$g_1 = T_{21}*X + T_{22}*Y + T_{23}*Z;$$

$$b_1 = T_{31}*X + T_{32}*Y + T_{33}*Z. \quad [4]$$

The operation of determining the second RGB stimulus value corresponding to the second tristimulus value may comprise mapping the second tristimulus value to the second RGB stimulus value based on the first mapping matrix.

Specifically, the second RGB stimulus value may be determined based on the mapping matrix T according to Equation [5]:

$$r_2 = T_{11}*X_1 + T_{12}*Y_1 + T_{13}*Z_1;$$

$$g_2 = T_{21}*X_1 + T_{22}*Y_1 + T_{23}*Z_1;$$

$$b_2 = T_{31}*X_1 + T_{32}*Y_1 + T_{33}*Z_1. \quad [5]$$

Before the operation S301 of determining the first RGB stimulus value and/or the operation S302 of determining the second RGB stimulus value, the method may further comprise calibrating the first mapping matrix.

Because there are different application scenarios, there may be errors in converting the tristimulus value into the RGB stimulus value based on the first mapping matrix. For example, a tristimulus value of 0.5 should be originally converted to a RGB stimulus value of 127 based on the first mapping matrix T, but actually can be converted to only 125 due to constraints of the environment. In order to convert the tristimulus value into the RGB stimulus value more accurately so as to control the color temperature of the display unit in a more precise manner, the first mapping matrix T may be calibrated.

In the operation S303, the first difference may be determined based on the first RGB stimulus value determined in the operation S301 and the second RGB stimulus value determined in the operation S302 according to Equation [6]:

$$r = r_1 - r_2;$$

$$g = g_1 - g_2;$$

$$b = b_1 - b_2. \quad [6]$$

The operation S304 of determining the first display parameter based on the first difference may comprise converting the first difference into a RGB gray level according to a first preset rule. The first display parameter may comprise the RGB gray level.

The first preset rule may comprise:

$$R = ((r - L_{leakage})/(L_{red\ max} - L_{leakage})) \wedge (1/\text{red gamma}) * 255;$$

$$G = ((g - L_{leakage})/(L_{green\ max} - L_{leakage})) \wedge (1/\text{green gamma}) * 255;$$

$$B = ((b - L_{leakage})/(L_{blue\ max} - L_{leakage})) \wedge (1/\text{blue gamma}) * 255. \quad [7]$$

where R indicates a red component of the RGB gray level, G indicates a green component of the RGB gray level, B indicates a blue component of the RGB gray level, $L_{leakage}$ indicates light leakage of the display unit, $L_{redmax}$ indicates a maximal display light intensity for a red component, $L_{greenmax}$ indicates a maximal display light intensity for a green component, $L_{bluemax}$ indicates a maximal display light intensity for a blue component, "red gamma" indicates a red gamma value determined based on a red component of the first difference, "green gamma" indicates a green gamma value determined based on a green component of the first difference, and "blue gamma" indicates a blue gamma value determined based on a blue component of the first difference.

The gamma values may be determined by looking up a table, for example, one as shown in Table 1. Referring to Table 1, the first column includes various grayscale levels, the second column includes various red brightness values corresponding to the respective grayscale levels in the first column, the third column includes various green brightness values corresponding to the respective grayscale levels in the first column, the fourth column includes various blue brightness values corresponding to the respective grayscale levels in the first column, the fifth column includes various red gamma values corresponding to the respective grayscale levels in the first column, the sixth column includes various green gamma values corresponding to the respective grayscale levels in the first column, and the seventh column includes various blue gamma values corresponding to the respective grayscale levels in the first column.

For example, the "red gamma" may be determined by searching for "r" calculated as above in the second column, selecting a row in which "r" is included, and then determining the value included in the fifth column at this row as the "red gamma." For a specific "r," if no corresponding record is found in the table, a corresponding gamma value can be determined by, for example, linear interpolation. Further, for a gray level, e.g., 0 and 255, which has no corresponding gamma record in the table, its respective gamma values may be determined as that of a gray level adjacent to it.

The "green gamma" and the "blue gamma" may be determined in the same manner as the "red gamma."

TABLE 1

| Grayscale | R | G | B | R_gamma | G_gamma | B_gamma |
|---|---|---|---|---|---|---|
| 0 | 0.3296 | 0.3294 | 0.329 | #NUM! | #NUM! | #NUM! |
| 7 | 0.3341 | 0.3412 | 0.3325 | 2.668302 | 2.661186 | 2.649069 |
| 15 | 0.3707 | 0.4359 | 0.3591 | 2.605367 | 2.613525 | 2.602196 |
| 23 | 0.4752 | 0.7106 | 0.4355 | 2.542515 | 2.549234 | 2.539294 |
| 31 | 0.6844 | 1.259 | 0.5886 | 2.479985 | 2.487672 | 2.476162 |
| 39 | 1.02 | 2.142 | 0.8353 | 2.428658 | 2.436335 | 2.423159 |
| 47 | 1.495 | 3.392 | 1.184 | 2.387032 | 2.395058 | 2.380676 |
| 55 | 2.112 | 5.008 | 1.637 | 2.354639 | 2.364281 | 2.347464 |
| 63 | 2.875 | 7.028 | 2.199 | 2.328487 | 2.337249 | 2.31982 |
| 71 | 3.804 | 9.472 | 2.884 | 2.302853 | 2.312519 | 2.292609 |
| 79 | 4.895 | 12.37 | 3.688 | 2.27963 | 2.288263 | 2.26802 |
| 87 | 6.159 | 15.7 | 4.614 | 2.256834 | 2.266469 | 2.245048 |
| 95 | 7.609 | 19.53 | 5.667 | 2.232929 | 2.243074 | 2.222528 |
| 103 | 9.258 | 23.86 | 6.863 | 2.206838 | 2.218807 | 2.197738 |
| 111 | 11.05 | 28.64 | 8.165 | 2.185393 | 2.19601 | 2.17692 |
| 119 | 13.01 | 33.81 | 9.587 | 2.164635 | 2.17646 | 2.156896 |
| 127 | 15.15 | 39.51 | 11.13 | 2.142961 | 2.154074 | 2.137077 |

TABLE 1-continued

| Grayscale | R | G | B | R_gamma | G_gamma | B_gamma |
|---|---|---|---|---|---|---|
| 135 | 17.42 | 45.5 | 12.76 | 2.124716 | 2.137288 | 2.121345 |
| 143 | 19.77 | 51.72 | 14.46 | 2.113449 | 2.126977 | 2.110882 |
| 151 | 22.28 | 58.37 | 16.24 | 2.101262 | 2.115709 | 2.103757 |
| 159 | 24.93 | 65.43 | 18.14 | 2.089616 | 2.103922 | 2.094865 |
| 167 | 27.72 | 72.82 | 20.24 | 2.078154 | 2.0939 | 2.074499 |
| 175 | 30.63 | 80.46 | 22.29 | 2.068254 | 2.087998 | 2.072041 |
| 183 | 33.67 | 88.52 | 24.46 | 2.058737 | 2.080438 | 2.067193 |
| 191 | 36.88 | 97.51 | 26.72 | 2.045468 | 2.052569 | 2.063469 |
| 199 | 40.53 | 106.7 | 29.17 | 2.000072 | 2.027816 | 2.046902 |
| 207 | 44.07 | 116.6 | 31.83 | 1.97339 | 1.984341 | 2.010723 |
| 215 | 48.17 | 127 | 34.63 | 1.886833 | 1.923244 | 1.958503 |
| 223 | 52.21 | 137.8 | 37.49 | 1.796316 | 1.837061 | 1.894861 |
| 231 | 56.3 | 148.7 | 40.44 | 1.669158 | 1.720173 | 1.797693 |
| 239 | 60.33 | 159.5 | 43.39 | 1.473165 | 1.539642 | 1.647028 |
| 247 | 63.9 | 169.3 | 46.09 | 1.181619 | 1.255546 | 1.440396 |
| 255 | 66.34 | 176.2 | 48.24 | #DIV/0! | #DIV/0! | #DIV/0! |

Hereinafter, some specific examples will be described. It is to be noted that the examples are provided just for illustration, but are not intended to limit the present disclosure. There can be various alternatives and modifications within the general concept disclosed herein.

Example 1

In this example, the electronic device comprises an LCD TV including an LCD display screen.

Figure 4:
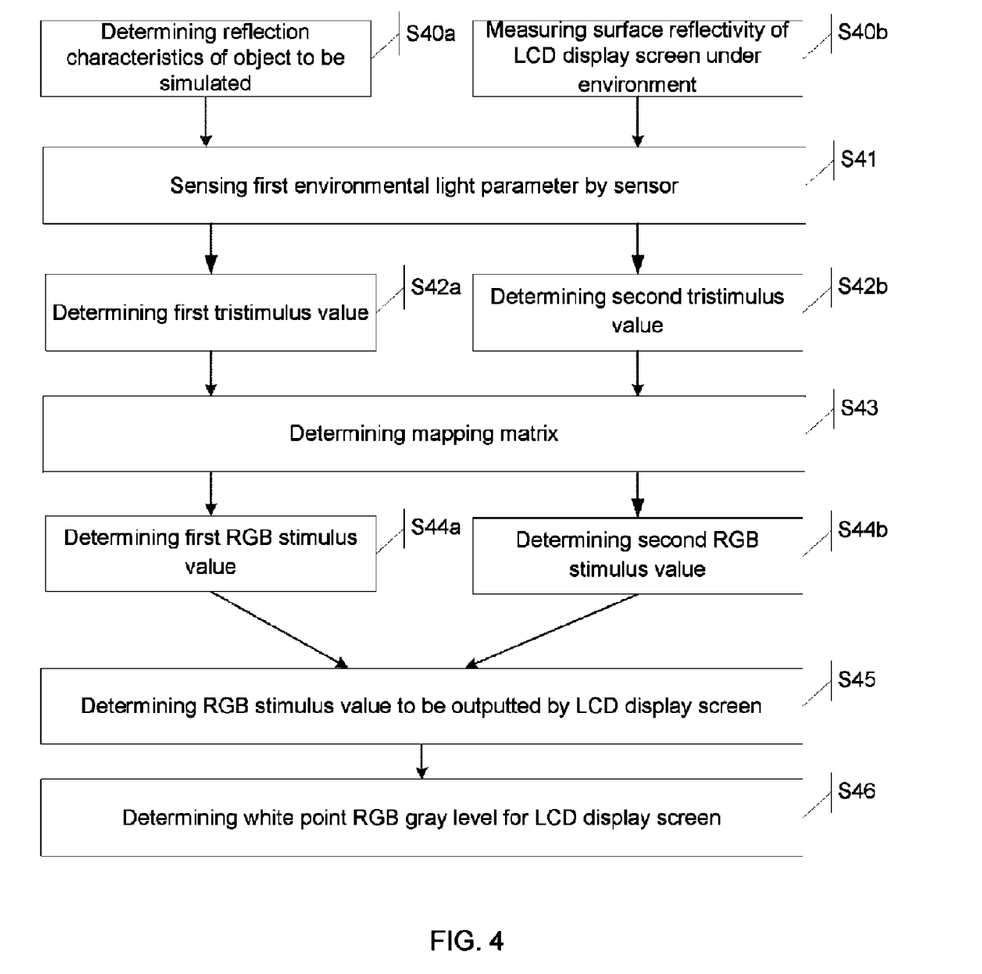
FIG. 4 is a flowchart schematically showing an information processing method according to a further embodiment of the present disclosure.

Referring to FIG. 4, the method may comprise:

Operation S40a: determining reflection characteristics of an object to be simulated, that is, a first reflection parameter f(X), f(Y), f(Z);

Operation S40b: measuring a surface reflectivity of the LCD display screen under the environment, that is, a second reflection parameter $f_1(X)$, $f_1(Y)$, $f_1(Z)$;

Operation S41: sensing a first environmental light parameter $X_0Y_0Z_0$ by a sensor, such as an illumination sensor;

Operation S42a: determining a tristimulus value, that is, a first stimulus value XYZ, for the object to be simulated based on the first environmental light parameter $X_0Y_0Z_0$ and the first reflection parameter f(X), f(Y), f(Z) according to, for example, Equation [1];

Operation S42b: determining a tristimulus value, that is, a second stimulus value $X_1Y_1Z_1$, for the surface reflection of the LCD display screen based on the first environmental light parameter $X_0Y_0Z_0$ and the second reflection parameter $f_1(X)$, $f_1(Y)$, $f_1(Z)$ according to, for example, Equation [2];

Operation S43: determining a mapping matrix, that is, a first mapping matrix T, for converting a tristimulus value XYZ into a RGB stimulus value rgb with respect to the LCD display screen;

Operation S44a: determining a first RGB stimulus value $r_1g_1b_1$, which should be outputted by the LCD display screen with respect to the object to be simulated, according to, for example, Equation [4];

Operation S44b: determining a second RGB stimulus value $r_2g_2b_2$ with respect to the reflection of the environmental light by the LCD display screen according to, for example, Equation [5];

Operation S45: determining a RGB stimulus value which should be outputted by the LCD display screen according to, for example, Equation [6]; and Operation S46: determining a white point RGB gray level from the RGB stimulus value based on gamma according to, for example, Equation [7], and performing remapping with respect to other intermediate gray levels by scaling.

Example 2

In this example, how to determine the first mapping matrix T will be explained.

1) A parametric matrix A for the display unit may be inputted. This matrix may be set as a variable, and may be inputted manually. A default value for the matrix may be:

$$A = \begin{pmatrix} 0.5904 & 0.3515 & 66.34 \\ 0.3358 & 0.56 & 176.2 \\ 0.1557 & 0.1222 & 48.24 \end{pmatrix}. \quad [8]$$

Let a matrix B be:

$$B = \begin{pmatrix} a_{13} & 0 & 0 \\ 0 & a_{23} & 0 \\ 0 & 0 & a_{33} \end{pmatrix}.$$

2) A variation matrix C for the parametric matrix A may be calculated as:

$$C = \begin{pmatrix} a_{11}*a_{13}/a_{12} & a_{13} & (1-a_{11}-a_{12})*a_{13}/a_{12} \\ a_{21}*a_{23}/a_{22} & a_{23} & (1-a_{21}-a_{22})*a_{23}/a_{12} \\ a_{31}*a_{33}/a_{32} & a_{33} & (1-a_{31}-a_{32})*a_{33}/a_{12} \end{pmatrix}, \quad [10]$$

where $a_{ij}$ indicates an element in the i-th row and j-th column of the parametric matrix A.

3) A transpose matrix D of the matrix C may be calculated.

$$D = \text{transpose}(C). \quad [11]$$

4) An inverse matrix E of the matrix D may be calculated.

5) A mapping matrix T, that is, the first mapping matrix, for converting a tristimulus value XYZ into a RGB stimulus value rgb may be:

$$T = B*E \quad [12]$$

Example 3

In this example, how to determine the matrix A as described in Example 2 will be explained.

1) A backlight brightness Y may be set based on an $E_v$ value of the environmental light as follows:

$$Y = E_v * f_1 / p_i,$$

where $E_v$ indicates an intensity of the environmental light, $f_1$ indicates an average emission ratio of the screen surface, and $p_i$ indicates the circumference ratio and has a numeric value of about 3.1416.

2) Determination of the parametric matrix A.

After the backlight brightness Y is determined as above, the parametric matrix A may be determined according to Table 2. For example, the parametric matrix A may be determined by searching for the "Y" calculated as above in the first column, selecting a row in which "Y" is included, and then determining a matrix included in the third column at this row as the parametric matrix A.

TABLE 2

| Y | Backlight | xy Y | | | $L_{leakage}$ |
|---|---|---|---|---|---|
| 4.769 | 10 | 0.5907 | 0.3523 | 1.114 | 0.00755 |
| | | 0.3394 | 0.5619 | 2.906 | |
| | | 0.1569 | 0.123 | 0.7753 | |
| 9.18 | 15 | 0.5906 | 0.3522 | 2.143 | 0.01234 |
| | | 0.3393 | 0.5619 | 5.591 | |
| | | 0.1569 | 0.1229 | 1.491 | |
| 15.77 | 25 | 0.5905 | 0.3522 | 4.955 | 0.01945 |
| | | 0.3392 | 0.5618 | 12.94 | |
| | | 0.1568 | 0.1229 | 3.453 | |
| 21.24 | 35 | 0.5905 | 0.3521 | 6.293 | 0.02539 |
| | | 0.3392 | 0.5617 | 16.47 | |
| | | 0.1569 | 0.1229 | 4.381 | |
| 27.8 | 45 | 0.5905 | 0.3521 | 6.486 | 0.03246 |
| | | 0.339 | 0.5617 | 16.94 | |
| | | 0.1568 | 0.1228 | 4.521 | |
| 32.18 | 50 | 0.5905 | 0.3521 | 7.503 | 0.03724 |
| | | 0.3389 | 0.5617 | 19.59 | |
| | | 0.1568 | 0.1228 | 5.233 | |
| 40.87 | 59 | 0.5905 | 0.352 | 9.534 | 0.04668 |
| | | 0.3386 | 0.5615 | 24.89 | |
| | | 0.1567 | 0.1228 | 6.635 | |
| 49.61 | 63 | 0.5905 | 0.352 | 11.58 | 0.05615 |
| | | 0.3384 | 0.5614 | 30.21 | |
| | | 0.1566 | 0.1227 | 8.04 | |
| 60.67 | 67 | 0.5905 | 0.352 | 14.11 | 0.0684 |
| | | 0.338 | 0.5612 | 36.95 | |
| | | 0.1565 | 0.1227 | 9.903 | |
| 69.4 | 70 | 0.5904 | 0.3515 | 16.13 | 0.07777 |
| | | 0.3358 | 0.56 | 42.27 | |
| | | 0.1557 | 0.1222 | 11.34 | |
| 80.26 | 75 | 0.5905 | 0.352 | 18.65 | 0.08972 |
| | | 0.338 | 0.5612 | 48.86 | |
| | | 0.1565 | 0.1227 | 13.14 | |
| 92.17 | 79 | 0.5905 | 0.352 | 21.38 | 0.1039 |
| | | 0.338 | 0.5612 | 56.1 | |
| | | 0.1565 | 0.1227 | 15.11 | |
| 100.9 | 81 | 0.5905 | 0.352 | 23.39 | 0.1123 |
| | | 0.338 | 0.5612 | 61.36 | |
| | | 0.1565 | 0.1227 | 16.54 | |
| 114.4 | 84 | 0.5905 | 0.352 | 26.52 | 0.1265 |
| | | 0.338 | 0.5612 | 69.63 | |
| | | 0.1565 | 0.1227 | 18.79 | |
| 134.9 | 87 | 0.5905 | 0.352 | 31.22 | 0.1489 |
| | | 0.338 | 0.5612 | 82.09 | |
| | | 0.1565 | 0.1227 | 22.2 | |
| 151 | 89 | 0.5905 | 0.352 | 34.93 | 0.1665 |
| | | 0.338 | 0.5612 | 91.9 | |
| | | 0.1565 | 0.1227 | 24.91 | |

For example, taking a Y of 9.18 as an example, its corresponding parametric matrix A should be:

$$A = \begin{pmatrix} 0.5906 & 0.3522 & 2.143 \\ 0.3393 & 0.5619 & 5.591 \\ 0.1569 & 0.1229 & 1.491 \end{pmatrix}.$$

3) It is determined whether the parametric matrix A determined at 2) is appropriate or not.

Specifically, this can be done as follows. First, r, g, and b values may be calculated according to, for example, Equations [4], [5], and [6]. Then, it is determined whether the r, g, and b values exceed their respective maximums or not. For example, assume that the maximums of the r, g, and b values are each 1, but the r value calculated above is 1.2, which exceeds the maximum. In this case, it is determined that the parametric matrix A is not appropriate, and then a next parametric matrix A may be selected. If none of the candidate parametric matrices A is qualified, then the r, g, and b values may be set to be their respective maximums. In the above example where r is calculated to be 1.2, r may be set to be 1.

Figure 5:
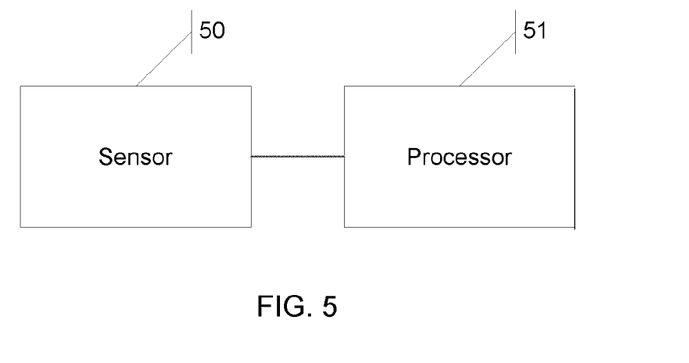
FIG. 5 is a diagram schematically showing a configuration of an electronic device according to an embodiment of the present disclosure.

According to a further embodiment, there is provided an electronic device including a display unit. Referring to FIG. 5, the electronic device may further comprise a sensor 50 configured to sense a first environmental light parameter under an environment where the electronic device is disposed; and a processor 51 configured to determine a first display parameter for output by the display unit based on the first environmental light parameter. When the display unit performs display based on the first display parameter, a difference between a first color temperature of the display unit and a second color temperature of the environment may be less than a first preset threshold.

The processor 51 may be further configured to determine a first reflection parameter of an object to be simulated, and to determine the first display parameter based on the first environmental light parameter and the first reflection parameter. The first display parameter may be one based on which the display unit displays the object to be simulated.

For example, the first reflection parameter may be stored in a storage of the electronic device in advance. Alternatively, the object to be simulated may be displayed on the display unit, and a reflection parameter thereof may be sensed by a sensor or some sensors as the first reflection parameter.

The first environmental light parameter may comprise an environmental tristimulus value in the environment.

The processor 51 may be further configured to determine a first tristimulus value of the object to be simulated based on the first reflection parameter and the environmental tristimulus value, and to determine the first display parameter based on the first tristimulus value.

The processor 51 may be further configured to determine a second reflection parameter based on reflection of environmental light in the environment by the display unit and to determine a second tristimulus value for the reflection of the environmental light by the display unit based on the second reflection parameter and the environmental tristimulus value, before determining the first display parameter based on the first tristimulus value.

The second reflection parameter may be sensed by various sensors, such as, a RGB sensor, a spectrograph, a spectrometer, and the like.

The processor 51 may be further configured to determine the first display parameter based on the first tristimulus value and the second tristimulus value.

The processor 51 may be further configured to determine a first RGB stimulus value corresponding to the first tristimulus value, to determine a second RGB stimulus value corresponding to the second tristimulus value, to determine a first difference between the first RGB stimulus value and the second RGB stimulus value, and to determine the first display parameter based on the first difference.

The processor 51 may be further configured to map the first tristimulus value to the first RGB stimulus value based on a first mapping matrix, and/or to map the second tristimulus value to the second RGB stimulus value based on the first mapping matrix.

The processor 51 may be further configured to calibrate the first mapping matrix before determining the first RGB stimulus value corresponding to the first tristimulus value and/or determining the second RGB stimulus value corresponding to the second tristimulus value.

The processor 51 may be further configured to convert the first difference into a RGB gray level according to a first preset rule. The first display parameter may comprise the RGB gray level.

The first preset rule may comprise:

$$R=((r-L_{leakage})/(L_{red\ max}-L_{leakage}))\wedge(1/\text{red gamma})*255,$$

$$G=((g-L_{leakage})/(L_{green\ max}-L_{leakage}))\wedge(1/\text{green gamma})*255, \text{ and}$$

$$B=((b-L_{leakage})/(L_{blue\ max}-L_{leakage}))\wedge(1/\text{blue gamma})*255,$$

where R indicates a red component of the RGB gray level, G indicates a green component of the RGB gray level, B indicates a blue component of the RGB gray level, $L_{leakage}$ indicates light leakage of the display unit, $L_{redmax}$ indicates a maximal display light intensity for a red component, $L_{greenmax}$ indicates a maximal display light intensity for a green component, $L_{bluemax}$ indicates a maximal display light intensity for a blue component, "red gamma" indicates a red gamma value determined based on a red component of the first difference, "green gamma" indicates a green gamma value determined based on a green component of the first difference, and "blue gamma" indicates a blue gamma value determined based on a blue component of the first difference.

The methods as described above may be performed by the electronic device, and the descriptions provided in the above method embodiments also apply to the electronic device. Therefore, detailed descriptions of configurations and operations of the electronic device are omitted here, just for concision.

According to the embodiments of the present disclosure, there may be some advantages.

As described above, the first display parameter for output by the display unit can be determined based on the first environmental light parameter under the environment where the electronic device is disposed. When the display unit performs display based on the first display parameter, the difference between the first color temperature of the display unit and the second color temperature of the environment may be less than the first preset threshold. As a result, it is possible for the display unit to achieve a better display effect. Because the color temperature of the display unit can be adjusted to achieve the better display effect directly based on the first environmental light parameter, the adjustment of the color temperature is more precise.

Further, the first display parameter may be determined based on the first reflection parameter of the object to be simulated and the first environmental light parameter. Therefore, the output from the display unit can mimic the object to be simulated, and thus it is possible to control the output from the display unit in a more precise manner.

Further, the first display parameter may be determined based on the first tristimulus value with respect to the reflection of the object to be simulated by the display unit and the second tristimulus value with respect to the reflection of the environmental light by the display unit. Therefore, it is possible to remove impacts caused by the reflection of the environmental light by the display unit, and thus to prevent the environmental light from interfering with the display of the display unit.

Further, the first mapping matrix may be calibrated before determining the first RGB stimulus value based on the first tristimulus value and/or determining the second RGB stimulus value based on second tristimulus value. As a result, it is possible to control the output from the display unit in a more precise manner.

According to a further embodiment of the present disclosure, correspondence between various display images and various image parameter values may be established. In this case, when an electronic device obtains an image to be displayed and determines an environmental light parameter value under an environment where the electronic device is disposed, the electronic device may determine a first image parameter value corresponding to the image to be displayed based on the correspondence between display images and image parameter values, and then adjust a display parameter value of a display unit of the electronic device based on the environmental light parameter value and the first image parameter value. Therefore, the adjusted display parameter takes both the environmental light and the image to be displayed into account. Assume that the electronic device is to display a blue image while it is in an environment of warm light. Light emitted from the display unit based on the display parameter which has been adjusted based on the environmental light parameter value and the first image parameter value will have a significantly greater blue component than a case where the display parameter is adjusted based on only the environmental light parameter value. Then, a user will perceive a blue image, which is shifted to the red side only slightly and thus differs from the original blue image to be displayed only slightly. Therefore, it is possible to meet the need of alleviating artifacts caused by determining the display parameter based on only the environmental light to improve user experiences.

According to an aspect of the present disclosure, there is provided a method for an electronic device with a display unit. The electronic device may comprise a tablet computer, a smart mobile phone, an electronic reader, and the like. The display unit may comprise an LCD (Liquid Crystal Display) display, an LED (Light Emitting Diode) display, a touch screen, such as a capacitive touch screen or a resistive touch screen, and the like.

Figure 6:
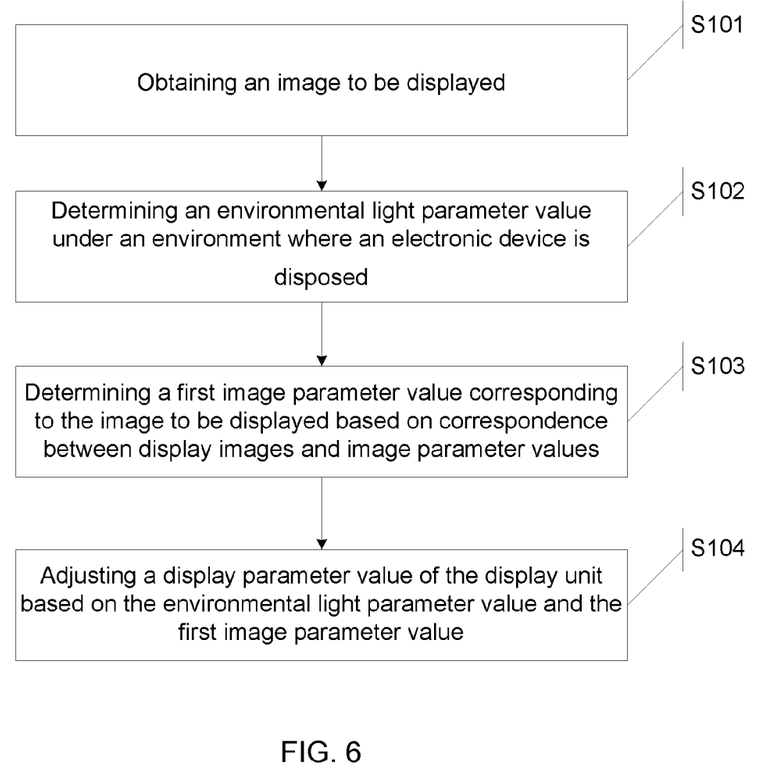
FIG. 6 is a flowchart schematically showing a parameter adjusting method according to an embodiment of the present disclosure.

As shown in FIG. 6, the method may comprise operation S601 of obtaining an image to be displayed, operation S602 of determining an environmental light parameter value under an environment where the electronic device is disposed, operation S603 of determining a first image parameter value corresponding to the image to be displayed based on correspondence between display images and image parameter values, and operation S604 of adjusting a display parameter value of the display unit based on the environmental light parameter value and the first image parameter value.

Hereinafter, an example where the electronic device comprises a tablet computer with a capacitive touch screen will be explained.

For example, when the user uses the tablet computer to read electronic books, the user may select background for a reading interface of a reader application, for better experiences. For example, the user may select rice paper, white paper, blue paper, red paper, or the like as the background. Not only a displayed image of the selected background in different colors and different texture but also the environmental light in the environment where the electronic device is disposed will impact a display effect of the background perceived by the user. Therefore, a manufacture of the electronic device or a developer of the reader application will establish, in factory or in developing of the reader application, correspondence between different (background) images and different image parameters in the electronic device or a software package. Further, an adjustment interface may be provided in an Operating System (OS) or the software package to be connectable to a database or a server where the correspondence between different (background) images and different image parameters is stored. Further, correspondence between any other images to be displayed by the tablet computer, such as wallpaper images, and respective image parameters may be established.

The image parameter value may comprise a color temperature value, a brightness value, or the like of the image. In the following, descriptions are directed to the color temperature parameter. However, the present disclosure is not limited thereto.

Specifically, when the display unit is to display a piece of paper with a color temperature value of x, such as a piece of rice paper, the electronic device will adjust backlight emitted from a backlight board of the display unit in color temperature value from to x, if without taking the environmental light into account. Here, "s" indicates an original color temperature value of the backlight. Thus, RGB components of the light emitted from the display unit include RGB components of the backlight. To consider both the color temperature parameter of the paper image itself and influences from the environmental light more precisely to reduce artifacts, we use a color temperature offset $\Delta Tc=x-s$ to indicate the color temperature parameter of the paper image, which may be stored in correspondence with the paper image.

The correspondence between display images and image parameter values may be saved in a table or in a database. The present disclosure is not limited thereto. For example, Table 3 gives an example where the correspondence between display images and image parameter values is saved in a table.

TABLE 3

| Display Image | Image Parameter Value (Offset ΔTc in a unit of K) |
|---|---|
| Rice Paper | x1 |
| Brown Paper | x2 |
| Printing Paper | x3 |
| Packaging Paper | x4 |

It is to be noted that the display images are not limited to those enumerated above. More images and thus more respective correspondence may be provided, to provide more options for the user. In Table 3, the column of "Display Image" may comprise actual names of the display images, or preset identifiers of the display images. The image parameter values may be set by those skilled in the art depending on actual applications. The present disclosure is not limited thereto.

After the correspondence is established as above, the user may start reading of an electronic book with the electronic device as follows. Referring to FIG. 6 and also Table 3, when the user launches the reader application and selects the rice paper image as the background, the operation S601 of obtaining an image to be displayed is performed. That is, the electronic device may retrieve the rice paper image as the background from a hard disk drive or a display memory thereof.

Then, the operation S602 of determining an environmental light parameter value under an environment where the electronic device is disposed is carried out. Specifically, the electronic device may obtain a RGB value of the environmental light from a RGB sensor which is provided internal to or outside the electronic device. Then, the parameter value, for example, the color temperature value, of the environmental light may be determined by calculations based on the RGB value or by looking up a table storing correspondence between RGB ratios and color temperature values, such as one shown in Table 4.

TABLE 4

| R Component | G Component | B Component | Environmental Ligh Color Temperature H (in a unit of K) |
|---|---|---|---|
| 1.0000 | 0.0425 | 0.0000 | 1000 K |
| 1.0000 | 0.0668 | 0.0000 | 1100 K |
| 1.0000 | 0.5458 | 0.2118 | 3300 K |
| 1.0000 | 1.0000 | 1.0000 | 6500 K |
| 0.5944 | 0.7414 | 1.0000 | 10000 K |

Next, the operation S603 of determining a first image parameter value corresponding to the image to be displayed based on correspondence between display images and image parameter values is carried out. Because the display image selected at the operation S601 is the rice paper image, the image parameter value corresponding to this rice paper image may be determined as $\Delta Tc=x1$, referring to Table 3. In this case, the first image parameter value is determined as x1.

The operation S603 may precede the operation S602, or they may be carried out simultaneously.

Then, the operation S604 of adjusting a display parameter value of the display unit based on the environmental light parameter value and the first image parameter value is carried out. Specifically, a first adjustment parameter value may be determined by adding the parameter value, for example, the color temperature value H, of the environmental light determined as above by looking up Table 4 or calculations based on the RGB value to the first image parameter value, that is, the offset ΔTc, resulting in H+ΔTc. Then, the display parameter value of the display unit, for example, the color temperature value of the light emitted from the display unit, may be adjusted to the first adjustment parameter value, H+ΔTc. The electronic device may display the image to be displayed, for example, the rice paper image, based on the adjusted display parameter value.

According to a further embodiment of the present disclosure, the electronic device may further comprise a tactile feedback unit connected to the display unit and configured to provide different tactile feelings to the user based on different images to be displayed, to provide the user more vivid tactile sensation so as to improve user experiences. For example, if the image to be displayed is the rice paper image, then the tactile feedback unit can provide the user a feeling of real rice paper; if the image to be displayed is the brown paper image, then the tactile feedback unit can provide the user a feeling of real brown paper; if the image to be displayed is a marble image, then the tactile feedback unit can provide the user a feeling of real marble.

Thus, after the operation S604, the method may further comprise: determining a first piece of tactile feedback information corresponding to the image to be displayed based on correspondence between display images and pieces of tactile feedback information; and controlling the tactile feedback unit to operate based on the first tactile feedback information, so as to provide tactile feedback corresponding to the first tactile feedback information to the user of the electronic device.

The tactile feedback unit may comprise a motor, a piezo-electric piece, and the like. Thus, the tactile feedback may be provided to the user by vibrations of the tactile feedback unit. The tactile feedback may be provided in various manners. For example, different frictions between fingers and the screen may be simulated by adjusting an electro-static field on a surface of the display unit, so that the user may feel "real" texture. The present disclosure is not limited thereto.

Specifically, the display unit may also display the correspondence between display images and pieces of tactile feedback information after displaying the image to be displayed. The electronic device may search for the first tactile feedback information corresponding to the image to be displayed. For example, if the image to be displayed is the rice paper image, the electronic device may determine the first tactile feedback information corresponding to the rice paper image by looking up a table, such as one shown in Table 5. In this case, the first tactile feedback information may be determined as y1.

TABLE 5

| Display Image | Tactile Feedback Info. |
|---|---|
| Rice Paper | y1 |
| Brown Paper | y2 |
| Printing Paper | y3 |
| Packaing Paper | y4 |
| Marble | y5 |

Then, the tactile feedback unit connected to the display unit may be powered on based on the first tactile feedback information, y1, to operate, and thus to provide the user of the electronic device a feeling of "real" rice paper.

The operation of determining the first tactile feedback information corresponding to the image to be displayed based on the correspondence between display images and pieces of tactile feedback information may be carried out after the operation S601 and before the operation S604. The operation of controlling the tactile feedback unit connected to the display unit to operate based on the first tactile feedback information so as to provide tactile feedback corresponding to the first tactile feedback information to the user of the electronic device may be carried out before or at the same time as the operation S604.

Figure 7:
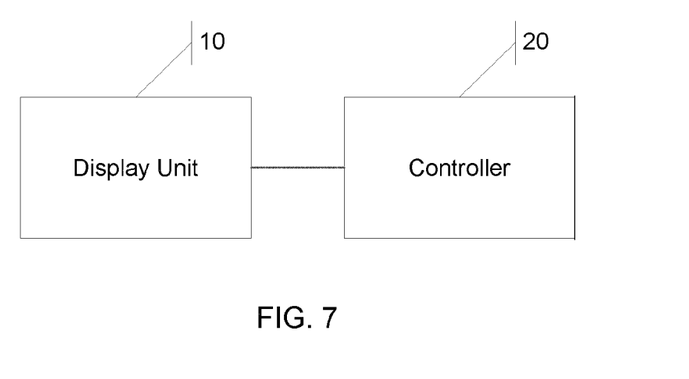
FIG. 7 is diagram schematically showing a configuration of an electronic device according to a further embodiment of the present disclosure.

According to a still further embodiment of the present disclosure, there is provided an electronic device. For example, the electronic device may comprise a tablet computer, a smart mobile phone, or an electronic reader. As shown in FIG. 7, the electronic device may comprise a display unit 10 configured to display an image to be displayed, and a controller 20 connected to the display unit 10 and configured to obtain the image to be displayed, determine an environmental light parameter value under an environment where the electronic device is disposed, determine a first image parameter value corresponding to the image to be displayed based on correspondence between display images and image parameter values, and adjust a display parameter value of the display unit based on the environmental light parameter value and the first image parameter value.

The electronic device may further comprise a RGB sensor provided internal to or outside the electronic device and configured to sense a RGB parameter value in the environment where the electronic device is disposed. The controller 20 may be further configured to determine the environmental light parameter value based on the RGB parameter value.

The controller 20 may be further configured to obtain a first adjustment parameter value by adding the environmental light parameter value to the first image parameter value, and to adjust the display parameter value of the display unit to the first adjustment parameter value so that the display unit is able to display the image to be displayed based on the first adjustment parameter value.

The controller 20 may be further configured to determine a first piece of tactile feedback information corresponding to the image to be displayed based on correspondence between display images and pieces of tactile feedback information. The electronic device may further comprise a tactile feedback unit connected to the display unit and configured to operate under control of the controller based on the first tactile feedback information, so as to provide tactile feedback corresponding to the first tactile feedback information to a user of the electronic device.

The environmental light parameter value may comprise a color temperature value in the environment, the image parameter value may comprise a color temperature value of the image, and the display parameter value may comprise a color temperature value of light emitted from the display unit.

The methods as described above may be performed by the electronic device, and the descriptions provided in the above method embodiments also apply to the electronic device. Therefore, detailed descriptions of configurations and operations of the electronic device are omitted here, just for concision.

According to the embodiments of the present disclosure, there may be some advantages.

As described above, the correspondence between various display images and various image parameter values may be established. In this case, when the electronic device obtains the image to be displayed and determines the environmental light parameter value under the environment where the electronic device is disposed, the electronic device may determine the first image parameter value corresponding to the image to be displayed based on the correspondence between display images and image parameter values, and then adjust the display parameter value of the display unit of the electronic device based on the environmental light parameter value and the first image parameter value. Therefore, the adjusted display parameter takes both the environmental light and the image to be displayed into account. Assume that the electronic device is to display a blue image while it is in an environment of warm light. Light emitted from the display unit based on the display parameter which has been adjusted based on the environmental light parameter value and the first image parameter value will have a significantly greater blue component than a case where the display parameter is adjusted based on only the environmental light parameter value. Then, the user will perceive a blue image, which is shifted to the red side only slightly and thus differs from the original blue image to be displayed only slightly. Therefore, it is possible to meet the need of alleviating artifacts caused by determining the display parameter based on only the environmental light to improve user experiences.

Further, the first tactile feedback information corresponding to the image to be displayed based on correspondence between display images and pieces of tactile feedback information may be determined. The tactile feedback unit may be controlled to operate based on the first tactile feedback information, so as to provide tactile feedback corresponding to the first tactile feedback information to the user of the electronic device. Therefore, the electronic device can provide tactile feedback corresponding to the image to be displayed to the user of the device, in addition to adjustment of the parameter of the light from the display unit based on the image to be displayed.

Those skilled in the art will appreciate that the embodiments of the present disclosure may be embodied by methods, apparatus (devices) or computer program products. Therefore, the technology disclosed herein can be implemented in hardware, software, or any combination thereof. The computer program products may comprise computer readable storage medium on which computer executable program codes are recorded. The computer readable storage medium comprises, but not limited to, magnetic disc, CD-ROM, and optical storage.

The embodiments are described with reference to the flowcharts and/or block diagrams. Each operation and/or block in the flowcharts and/or block diagrams or any combination thereof may be implemented by computer program instructions. A general computer, an application specific computer, an embedded processor, or processors of other programmable data processing devices, when executing the computer program instructions, will convert into a machine which achieves function(s) specified by one or more operations in the flowcharts and/or one or more blocks in the block diagram.

The computer program instructions may be stored in computer readable memories which can instruct computers or other programmable data processing devices to operate in a specified manner, resulting in products containing instruction apparatus to achieve function(s) specified by one or more operations in the flowcharts and/or one or more blocks in the block diagram.

The computer program instructions may be loaded onto computers or other programmable data processing devices, so that the computers or other programmable data processing devices may carry out a series of processes, to achieve function(s) specified by one or more operations in the flowcharts and/or one or more blocks in the block diagram.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for displaying an image in an electronic device with a display unit, the method comprising:
    obtaining the image to be displayed from a list of display images and corresponding preset adjustment values;
    determining an environmental light parameter value for an environmental light parameter under an environment where the electronic device is disposed;
    determining a first image parameter value corresponding to the image to be displayed, for an image parameter corresponding to the environmental light parameter, wherein the first image parameter value is determined based on correspondence between display images and preset adjustment values for the image parameter, the first image parameter value is a preset adjustment value for the image parameter assigned to the image;
    adjusting a display parameter value of the display unit for a display parameter corresponding to the environmental light parameter, wherein adjusting the display parameter value comprises:
        determining a first adjustment parameter value being a function of a sum of the environmental light parameter value and the first image parameter value; and
        adjusting the display parameter value to the first adjustment parameter value; and
    displaying the image using the adjusted display parameter value.

2. The method according to claim 1, wherein after obtaining the image to be displayed, the method further comprises:
    determining a first piece of tactile feedback information corresponding to the image to be displayed based on correspondence between display images and pieces of tactile feedback information; and
    controlling a tactile feedback unit connected to the display unit to operate based on the first piece of tactile feedback information, so as to provide tactile feedback corresponding to the first piece of tactile feedback information to a user of the electronic device.

3. The method according to claim 1, wherein the environmental light parameter value comprises a color temperature value in the environment, the first image parameter value comprises a color temperature value of the image, and the display parameter value comprises a color temperature value of light emitted from the display unit.

4. The method according to claim 1, wherein the preset adjustment value for the image parameter is an offset between an image parameter value for displaying the image and an original image parameter value of backlight of the display unit.

* * * * *